United States Patent [19]

Seki et al.

[11] Patent Number: 5,021,966
[45] Date of Patent: Jun. 4, 1991

[54] PROFILE REVISING METHOD

[75] Inventors: Masaki Seki; Takashi Takegahara, both of Tokyo; Takeshi Arakaki, Yamanashi, all of Japan

[73] Assignee: Fanuc Ltd., Minamitsuru, Japan

[21] Appl. No.: 348,581

[22] PCT Filed: Sep. 8, 1988

[86] PCT No.: PCT/JP88/00904
§ 371 Date: Apr. 25, 1989
§ 102(e) Date: Apr. 25, 1989

[87] PCT Pub. No.: WO89/02619
PCT Pub. Date: Mar. 23, 1989

[30] Foreign Application Priority Data

Sep. 10, 1987 [JP] Japan .................................. 62-225383

[51] Int. Cl.$^5$ ............................................. G06F 15/46
[52] U.S. Cl. ................................. 364/474.26; 364/192; 318/568.1
[58] Field of Search ................. 364/474.22–474.27, 364/474.29, 191–193, 188, 189; 318/568.1; 340/701–704

[56] References Cited

U.S. PATENT DOCUMENTS

| 4,521,860 | 6/1985 | Kanematsu et al. | 364/474.26 |
| 4,543,625 | 9/1985 | Nozawa et al. | 364/474.29 X |
| 4,556,833 | 12/1985 | Kishi et al. | 364/474.23 |
| 4,648,028 | 3/1987 | DeKlotz et al. | 364/474.22 X |
| 4,734,845 | 3/1988 | Kawamura et al. | 364/167.01 X |

*Primary Examiner*—Joseph Ruggiero
*Attorney, Agent, or Firm*—Staas & Halsey

[57] ABSTRACT

When an item ($T_1$ or $T_2$) for revising chamfering or rounding is selected from a menu table (108b) of a tablet device (108), all corner portions ($E_1$-$E_3$) included in profile ($A_1$) and pertaining to the revision item (e.g., the item for revision rounding) are displayed in a color different from the other portions of the profile. Thereafter, a corner portion ($E_1$) requiring revision is designated by a graphic cursor (K), whereupon the corner portions ($E_2$, $E_3$) other than the designated corner portion return to the original color so that only the designated corner portion ($E_1$) may be identified for revision.

3 Claims, 5 Drawing Sheets

AMOUNT OF ROUNDING = a

AMOUNT OF CHAMFER = b

PROFILE REVISING METHOD

DESCRIPTION

1. Technical Field

This invention relates to a method of revising a profile, and more particularly, to a profile revising method for specifying a profile by figure definition statements in an automatic programming language and revising a corner portion such as a chamfered or rounded corner portion of the designated profile.

2. Background Art

In an automatic programming system for creating NC data using an automatic programming language such as APT (automatic programming tools) or FAPT, (a) a part program based on the automatic programming language is created by defining points, straight lines and circular arcs using simple symbols (this is referred to as "figure definition"), defining a profile using the defined points, straight lines and circular arcs, and then defining a tool path along the profile (referred to as "motion statement definition"), and (b) the part program based on the automatic programming language is subsequently converted into NC data comprising NC data (EIA codes or ISO codes) in a format capable of being executed by an NC unit.

In order to define a predetermined profile upon inserting roundness at a corner portion after figure definition of various figure elements $S_1$-$S_3$, $C_1$ shown in FIG. 7, the defined figure element symbols are used to enter the following:

$S_1$, $r_1R$
$S_3$
$C_1$
$S_2$, $r_2R$
$S_1$

It should be noted that a profile A0 is defined by inserting roundness of radius $r_1$ sides $S_1$, $S_3$ and roundness of radius $r_2$ between sides $S_1$, $S_2$ by the aforementioned motion statement, as shown in FIG. 8.

More specifically, the figure elements are arranged in order along the profile and rR (where r is a radius value and R is a letter of the alphabet) indicating rounding is disposed between the linear symbols which indicate the two straight lines at which roundness is to be inserted. Thus, when a profile having roundness is defined, it is required that the operator know which sides are contacted by the circular arc of the roundness to be inserted. The same is true also when it is attempted to revise roundness after a profile has been defined. When a profile is displayed on a display screen and a problem is found with regard to a prescribed rounded corner portion, the operator must check the symbols (let these be $S_i$, $S_j$) of the sides adjacent this corner portion and revise the profile by entering $S_i$, rR
$S_j$ This is troublesome task.

Furthermore, even if corner arcs appear to be the same, the circular arc of a corner portion $E_1$ (FIG. 8) is defined by roundness $r_1R$, and the circular arc of a corner portion $E_3$ is defined as a part of circle $C_1$. In other words, if roundness is to be revised, the revision must be made while being aware of whether the circular arc was defined by the qualifier "R" indicating rounding or by the definition identification "C" indicating a circle. This also is a troublesome operation. Though the foregoing relates to a rounded corner portion, the same is true for a chamfered corner portion.

Accordingly, an object of the present invention is to provide a profile revising method through which a revising operation can be performed by desigating a corner portion such as a chamfered or rounded corner portion desired to be revised and clarifying the location at which the revision is to be made.

DISCLOSURE OF THE INVENTION

In the profile revising method of the present invention, revision of chamfering or rounding is designated, whereby chamfered corner portions in the case of chamfering revision and rounded corner portions in the case of rounding revision are displayed in a color different from that of the other portions of the profile. By designating a corner portion displayed in the different color, the chamfered corner portion or rounded corner portion to be revised is specified to revise the dimensions of this corner portion or delete the corner portion.

BEST MODE FOR CARRYING OUT THE INVENTION

Figure 1:
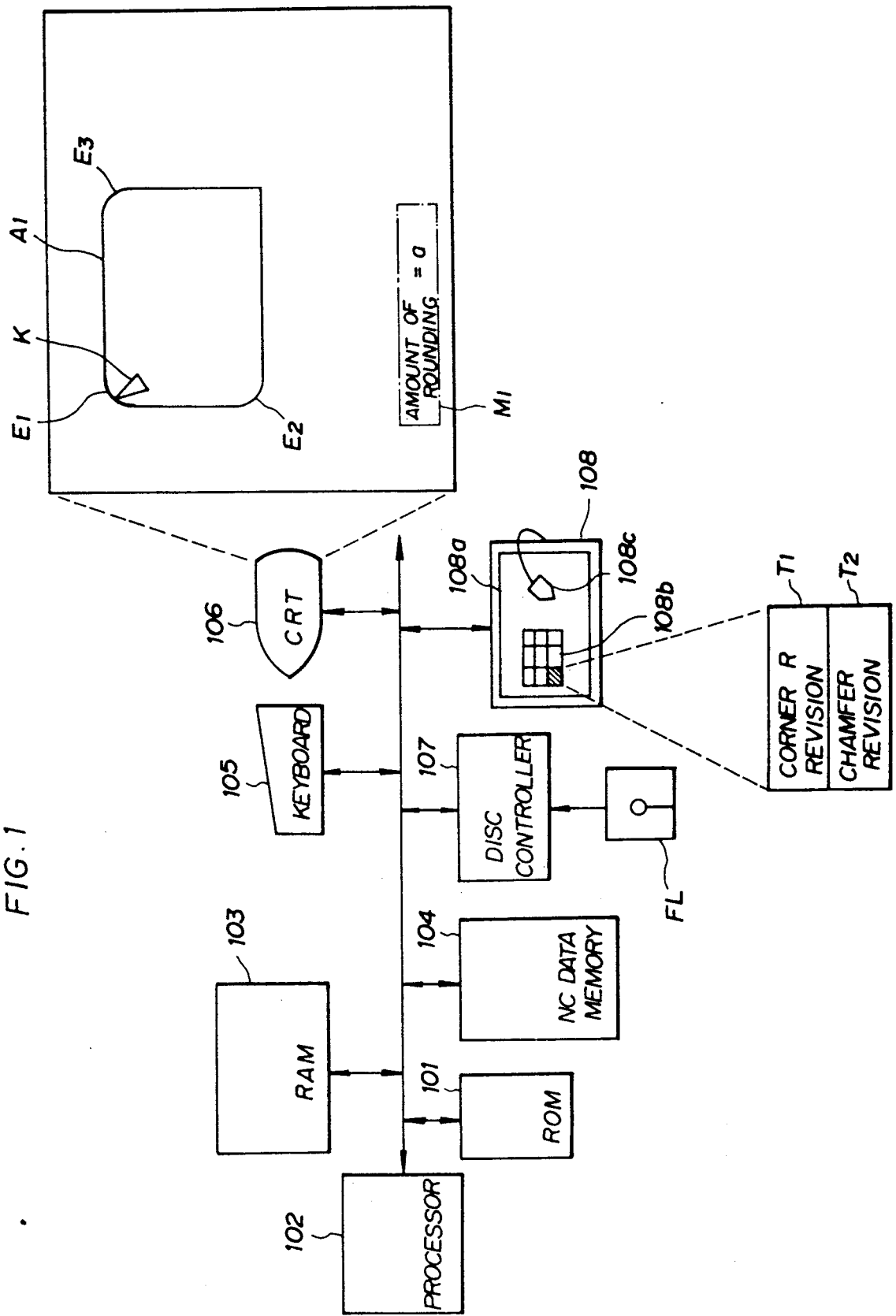
FIG. 1 is a block diagram of an apparatus for practicing the present invention.

FIG. 1 is a block diagram of an apparatus for practicing the present invention.

Numeral 101 denotes a ROM storing a loading program and the like, 102 a processor for executing automatic programming processing, and 103 a RAM for storing a system program read in from a floppy FL, as well as various parameters and results of processing. Numeral 104 denotes an NC data memory for storing the finally created NC data having an executable format, 105 a keyboard, 106 a display unit (CRT), 107 a disc controller, and 108 a tablet device having a tablet surface 108a to which a menu chart 108b having menu items is affixed. Prescribed menu items are picked by a tablet cursor 108c. A graphic cursor K on a display screen is moved by moving the cursor 108a on the tablet surface. FL represents a floppy disc.

Figure 2:
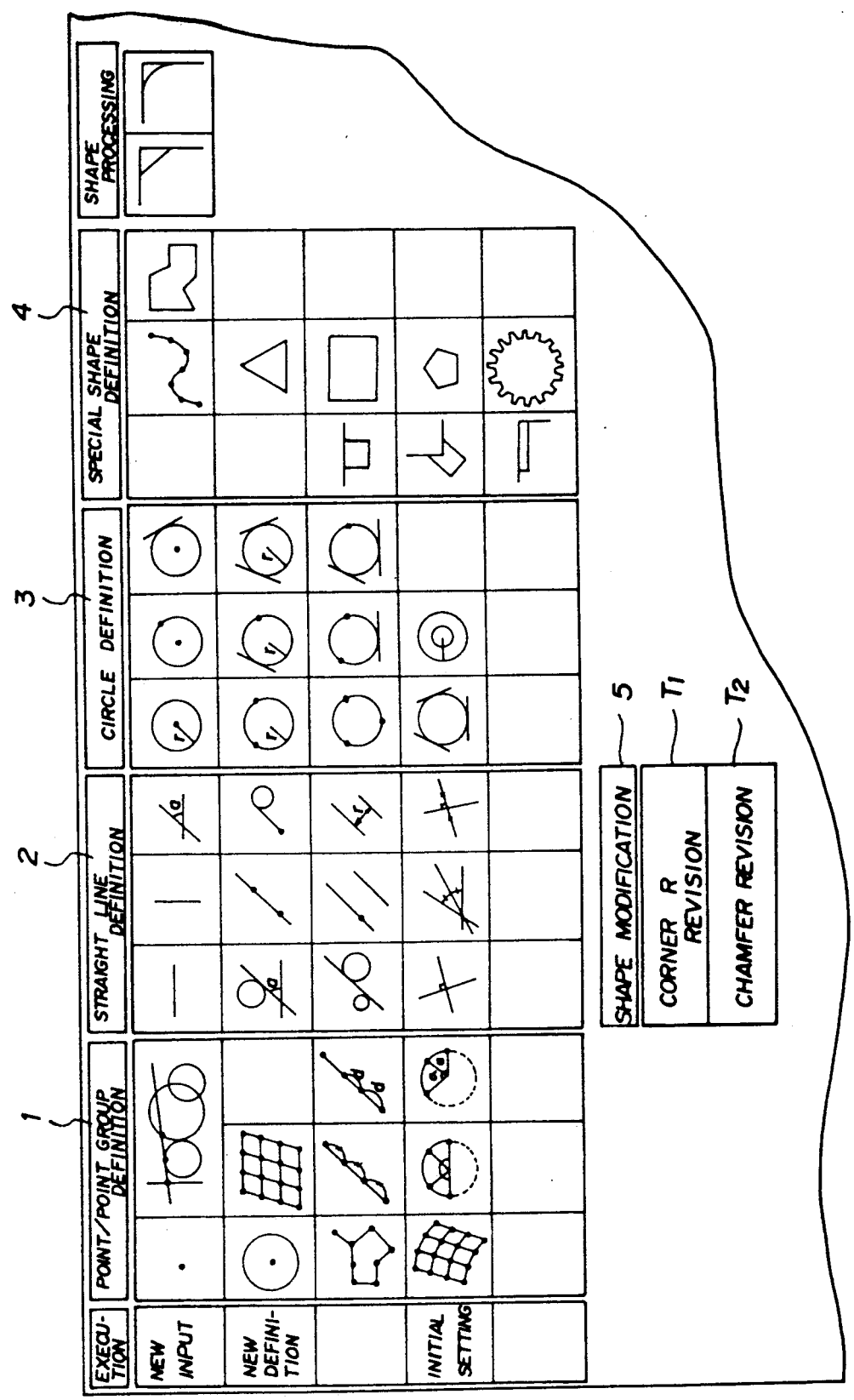
FIG. 2 is a view for describing the principal portion of a menu chart.

FIG. 2 is a view for describing the principal parts of the menu chart 108b. Numeral 1 is a "POINT/POINT GROUP DEFINITION" section, 2 a "STRAIGHT LINE DEFINITION" section, 3 a "CIRCLE DEFINITION" section, 4 a "SPECIAL SHAPE DEFINITION" section and 5 a "SHAPE MODIFICATION" section. The "SHAPE MODIFICATION STATEMENT" section 5 is provided with a "CORNER R REVISION" section $T_1$ indicating an item for revising a rounded portion, and a "CHAMFER REVISION" section $T_2$ indicating an item for revising a chamfered portion.

Figure 3:
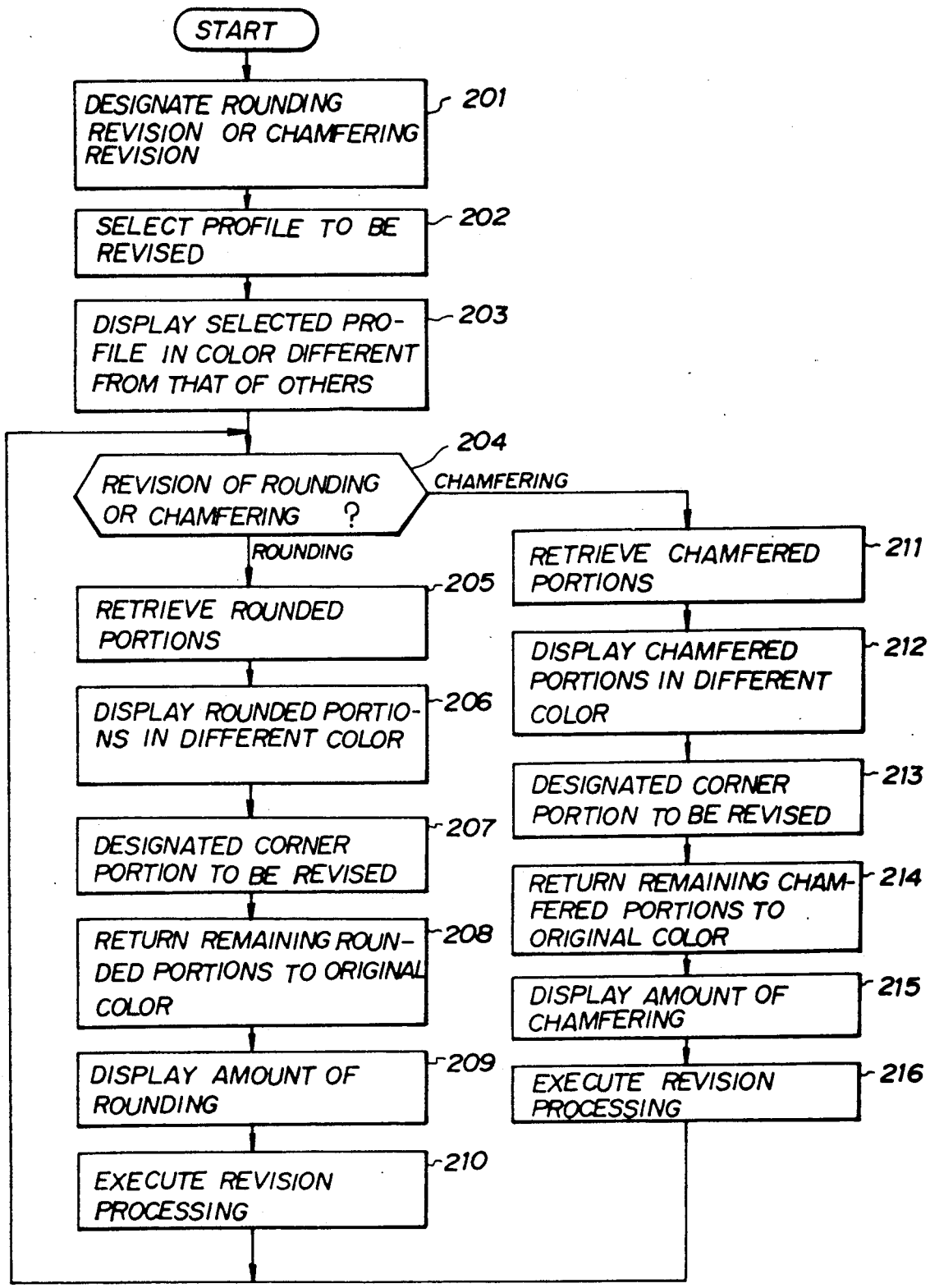
FIG. 3 is a flowchart of processing according to the invention.
Figure 4:
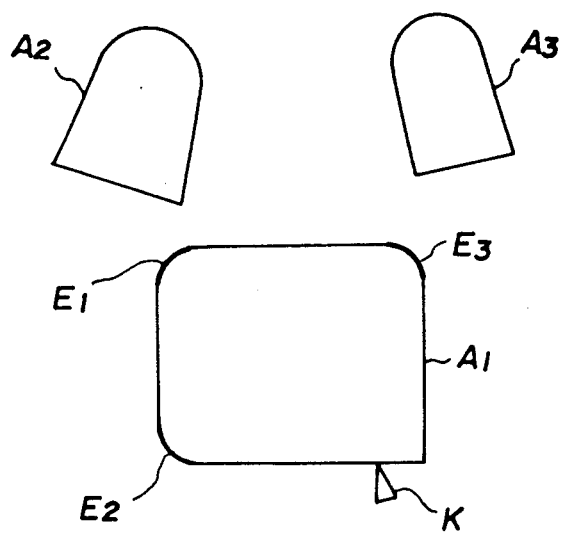
FIGS. 4 through 6 are views for describing processing according to the invention.
Figure 5:
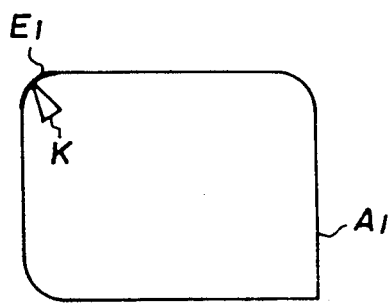
Figure 6:
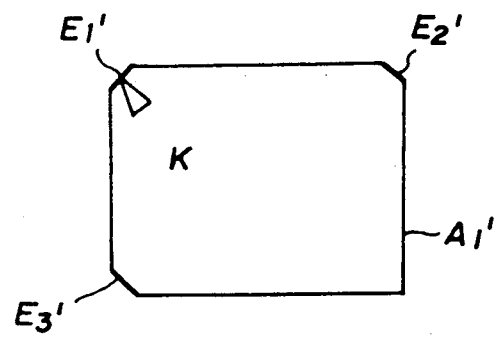
Figure 7:
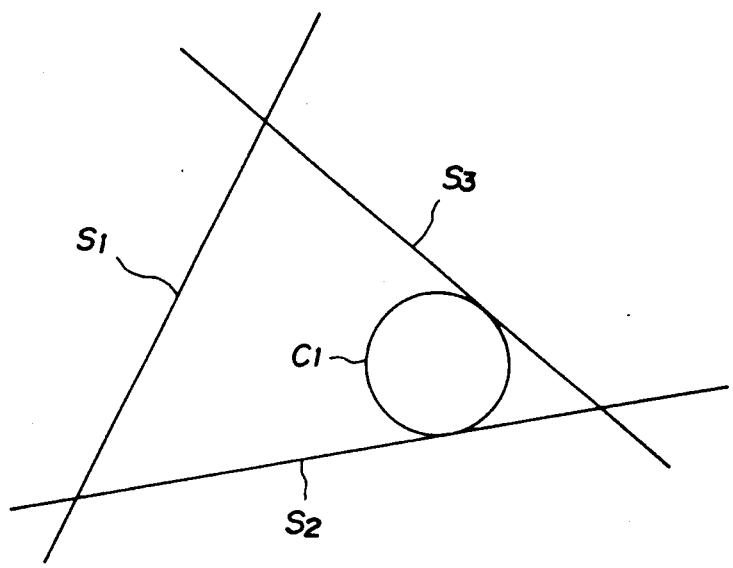
FIG. 7 and 8 are views for describing a method according to the prior art.
Figure 8:
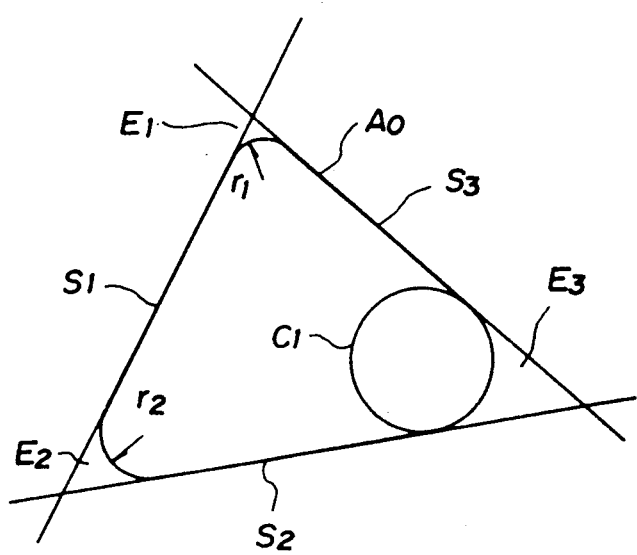

FIG. 3 is a flowchart of processing according to the invention, and FIGS. 4 through 6 are views for describing the processing of the invention. The profile revising method of the present invention will now be described in accordance with these Figures. It will be assumed here that profiles $A_1$, $A_2$, $A_3$ shown in FIG. 4 have already been defined and are being displayed on the display screen 106 in a predetermined color (e.g., green). The processor 102 obtains a straight line (inclusive also of a chamfered portion) constituting a profile by obtaining and storing the coordinates $(x_i, y_i), (x_j, y_j)$ of two points on the straight line from a figure definition statement, as in the manner $S = x_i, y_i, x_j, y_j$ and obtains a circular arc (inclusive also of a rounded portion) by obtaining and storing the coordinates $(x_c, y_c)$ of the center of the circular arc and the radius r thereof from the figure definition statement, as in the manner $C = x_c, y_c, r_c$ In addition, the processor stores a flag indicating whether there is a chamfered portion with regard to a straight line and a flag indicating whether there is a rounded portion with regard to a circular arc, arranges these straight lines and circular arc in the order in which the profile is defined, and stores the profile.

When the operator picks "CORNER R REVISION" $T_1$ from the menu table 108b on the tablet 108, the processor displays a graphic cursor K on the display screen 106 to make it possible to select a shape (step 201).

If the graphic cursor K is aligned with the profile $A_1$ to pick this profile as one requiring a revision from among the profiles $A_1$, $A_2$, $A_3$ (step 202), the processor 102 causes the selected profile $A_1$ to be displayed in a color (e.g., blue) different from that of the other profiles (step 203).

Thereafter, the processor determines whether revision of roundness or revision of chamfering is to be performed (step 204). If roundness is to be revised, the processor checks shape data indicative of the selected profile $A_1$, retrieves, as rounded portions, figure elements which are circular arcs and whose flags, therefore, are on (step 205), and displays all of these retrieved rounded portions $E_1$-$E_3$ in a different color (e.g., yellow) (step 206). As a result, the profile $A_1$ to be revised and the rounded portions $E_1$-$E_3$ can be recognized at a glance.

Thereafter, the graphic cursor K is aligned with the rounded portion $E_1$ to pick this as one requiring a revision from among the rounded portions $E_1$-$E_3$ (step 207), and the processor causes the display of the rounded portions $E_2$, $E_3$ to return to its original color (blue) (step 208). As a result, the sole rounded portion $E_1$ requiring the revision is easily recognized The processor 102 then causes "AMOUNT OF ROUNDNESS=a"

to be displayed at the bottom of the display screen 106 to indicate the amount of roundness a of the rounded portion $E_1$ (step 209; see FIG. 5).

Accordingly, when a numerical value b serving as the revision is inputted from the keyboard 105, the processor revises the amount of roundness of the designated rounded portion from a to b (step 210).

When "AMOUNT OF ROUNDNESS=☐" is entered instead of a numerical value, the processor deletes the circular arc of the rounded portion.

At the end of the revision, the processor returns the profile $A_1$ to the selected state to make possible a revision of the next rounded portion of the profile $A_1$. By performing a prescribed operation, the display screen can be returned to its initial presentation, after which revision of a chamfered portion or revision of another profile may be carried out in the same manner as just described.

The item "CORNER R REVISION" $T_1$ for revising a rounded portion is selected in the foregoing description. However, if the item "CHAMFER REVISION" $T_2$ for revising a chamfered portion is selected, revision processing can be executed in the same manner as in revision of the rounded portion. That is, as shown in FIG. 6, a profile $A_1'$ requiring revision is designated from among profiles displayed on the display screen 106. When this is done, all chamfered portions $E_1'$-$E_3'$ corresponding to the selected revision item $T_2$ and included in the specified profile $A_1'$ are displayed in a different color. Then, when the chamfered portion $E_1'$ requiring revision is designated, the other chamfered portions $E_2'$, $E_3'$ are returned to their original color. This makes it possible to clearly distinguish and revise solely the designated chamfered portion $E_1'$.

Thus, in accordance with the present invention, an item for revising chamfering or rounding is selected and a profile requiring revision is designated from among profiles displayed on a display screen, whereupon all corner portions corresponding to the selected revision item and included in the specified profile are displayed in a different color. When a corner portion requiring revision is selected, corner portions other than the designated color portion return to their original color so that solely the designated corner portion can be recognized and revised. This makes it possible to perform a revising operation by uniquely designating a corner portion such as a chamfered or rounded corner portion desired to be revised, and clarifying the location at which the revision is to be made.

We claim:

1. A profile revising method for revising a corner portion, such as a chamfered or rounded corner portion, of a profile designated by a figure definition statement, characterized by:
    determining whether a chamfered shape or a rounded shape is to be revised when revision of a chamfered shape or rounded shape of a prescribed profile is designated;
    displaying chamfered corner portions in case of revision of a chamfered shape, and rounded corner portions in case of revision of a rounded shape, in a color different from that of other portions of the profile;
    when a prescribed corner portion is designated from the corner portions displayed in the different color, identifying said designated corner portion as being a chamfered corner portion or a rounded corner portion to be revised; and
    revising dimensions of said corner portion or deleting said corner portion in accordance with a dimension revising instruction or deletion instruction.

2. A profile revising method according to claim 1, characterized by:
    converting a figure definition statement of a linear element constituting a profile into coordinates of two points and storing the coordinates;
    providing a flag which indicates whether said linear element is a chamfered portion;
    converting a figure definition statement of a circular-arc element constituting a profile into coordinates of a center of the arc and radius of the arc, and storing the coordinates and the radius;
    providing a flag which indicates whether said circular arc is a rounded portion;

identifying the circular-arc portion for which the flag is ON as a rounded portion in case of revision of a rounded shape; and identifying the linear portion for which the flag is ON as a chamfered portion in case of revision of a chamfered shape.

3. A profile revising method according to claim 1, characterized in that among the corner portions displayed in the different color, only a designated corner portion is displayed in a separate color.

* * * * *